US006189781B1

(12) United States Patent
Yoshinaga et al.

(10) Patent No.: US 6,189,781 B1
(45) Date of Patent: Feb. 20, 2001

(54) TERMINAL UNIT HAVING FUNCTION FOR CONVERTING COMMODITY INFORMATION INTO BAR CODE AND VICE VERSA

(75) Inventors: Shinichi Yoshinaga; Miyuki Sato; Shigeki Enoki; Kiyoshi Utsumi, all of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 08/337,222

(22) Filed: Nov. 7, 1994

(30) Foreign Application Priority Data

Dec. 8, 1993 (JP) ........................................ 5-307632

(51) Int. Cl.[7] ........................................ G06F 17/00
(52) U.S. Cl. ........................................ 235/375; 235/379
(58) Field of Search ........................................ 235/383, 375, 235/379; 705/14, 16, 17

(56) References Cited

U.S. PATENT DOCUMENTS 4,529,871 * 7/1985 Davidson ........................................ 235/383
5,162,639 * 11/1992 Sugiyama ........................................ 235/383
5,250,789 * 10/1993 Johnsen ........................................ 235/383
5,278,396 * 1/1994 McGaha ........................................ 235/432
5,399,846 * 3/1995 Pavlidis et al. ........................................ 235/462

FOREIGN PATENT DOCUMENTS 59-194261 11/1984 (JP) .

* cited by examiner

*Primary Examiner*—Karl D. Frech
(74) *Attorney, Agent, or Firm*—Staas & Halsey LLP

(57) ABSTRACT

A terminal unit processes commodity information relating to each of one or more commodities involved in a transaction and transaction information defining the transaction. The terminal unit includes a first conversion unit for converting the transaction information for a transaction, including at least the input commodity information for each commodity involved in the transaction, into a corresponding high density bar code pattern which is supplied to a printer which prints the corresponding high density bar code pattern on a recording sheet. A bar code reader optically reads the high density bar code pattern, printed on the recording sheet, and outputs the corresponding transaction and related commodity information for processing by the terminal unit. The bar code reader distinguishes between a first bar code pattern read from the commodity and a second, higher density bar code pattern printed on and read from a recording sheet.

32 Claims, 11 Drawing Sheets

FIG. 3A

PDF 417

FIG. 3B

DATACODE

FIG. 3C

VERICODE

FIG. 3D

00012345678905

CODE I GK

FIG. 7A

| POS NO. | DEPARTMENT | NUMBER | AMOUNT |
|---|---|---|---|
| 1001 | 001 | 10 | 1800 |
| | 002 | 80 | 19000 |
| | | | |
| | | | |
| 1002 | | | |

FIG. 7B

| DEPARTMENT | POS NO. | NUMBER | AMOUNT |
|---|---|---|---|
| 001 | 1001 | | |
| | 1002 | | |
| | TOTAL | | |
| 002 | | | |
| | | | |

FIG. 9

ACCOUNTS SERVICE YY, MM,DD

| DATE | SYNOPSIS | AMOUNT |
|---|---|---|
| MM DD | VEGETABLE | 286 |
| MM DD | EGG | 208 |
| ⋮ | ⋮ | ⋮ |
| | TOTAL | 14,980 |

TERMINAL UNIT HAVING FUNCTION FOR CONVERTING COMMODITY INFORMATION INTO BAR CODE AND VICE VERSA

BACKGROUND OF THE INVENTION (1) Field of the Invention

The present invention generally relates to a terminal unit, such as a POS (Point-of-Sale) terminal unit, and more particularly to a terminal unit in which commodity information input therein can be converted into a bar code and vice versa.

(2) Description of the Related Art

Conventionally, in stores, in order to register information (including names, identification codes, unit prices, quantity and the like) on commodities bought by customers, POS (Point-of-Sales) terminal units have been used. The POS terminal units print the information on receipt papers and journal papers and transmit the information to a host computer. The information processed by the POS terminal units is referred to as transaction information. The transaction information includes commodity information and other information regarding the transaction. The commodity information may include a commodity name, an identification code of a commodity, a unit price of a commodity, a number of commodities of each kind and consumption tax. Other information may include a total price, a date, a name of an operator of a POS terminal unit, a commodity dealing department and an identification number of a POS terminal unit.

If incorrect commodity information (e.g. the unit price of a commodity or the quantity of a commodity) is registered by a POS terminal unit by mistake so that a receipt paper on which the incorrect commodity information has been printed is given to a customer, the registered incorrect commodity information must be corrected. In this case, in order to correct the incorrect commodity information which has been registered, an operator manually inputs, with reference to the transaction information on the receipt paper, the incorrect commodity information into the POS terminal unit by using a keyboard.

In a host computer coupled to a plurality of POS terminal units, transaction data items including information about commodities transmitted from the POS terminal units are aggregated. In this system formed of the POS terminal units and the host computer, if a trouble occurs in the host computer, the above transaction data items can not be aggregated in the host computer. In this case, transaction data items printed on journal papers in the respective POS terminal units are used as backup data. That is, the transaction data items are manually input, with reference to the journal papers, into the POS terminal units.

In the conventional POS terminal unit, as has been described above, to correct registered information and to aggregate transaction data items in place of the host computer, transaction data items must be manually input with reference to receipt papers or journal papers. Thus, input errors may easily occur.

In addition, for example, the following service for customers has been proposed.

In the host computer, transaction information supplied from the POS terminal units is aggregated for each customer having a membership card. When an aggregate request is input to a POS terminal unit along with a membership number identifying a customer, transaction information which has been aggregated for the customer is transmitted from the host computer to the POS terminal unit. The aggregated transaction information for the customer is printed by the POS terminal unit and the print is given to the customer. The customer can use the print as accounts for himself (herself). This service is referred to as an accounts supply service.

However, to provide this accounts supply service, the aggregated transaction information for each customer must be usually stored in a storage unit of the host computer. In addition, a customer not having a membership card can not obtain the accounts supply service.

SUMMERY OF THE INVENTION

Accordingly, a general object of the present invention is to provide a novel and useful terminal unit, such as a POS terminal unit, in which the disadvantages of the aforementioned prior art are eliminated.

A more specific object of the present invention is to provide a terminal unit capable of printing out commodity information, which has been registered, having a form which can be easily input to the terminal unit.

The above objects of the present invention are achieved by a terminal unit, to which commodity information is input, for processing input commodity information, the commodity information being information regarding one or a plurality of commodities in a transaction, the terminal unit comprising: first conversion means for converting transaction information including at least the input commodity information into information corresponding to a bar code, the transaction information being information regarding the transaction of one or a plurality of commodities; and bar code printing means for printing the bar code on a sheet based on the information obtained by the first conversion means.

According to the present invention, since the commodity information is printed on a recording paper as a bar code, the commodity information can be easily input to the terminal unit by scanning the bar code.

Another object of the present invention is to provide a terminal unit capable of easily processing target commodity information items which have been input therein.

The above object of the present invention is achieved by a terminal unit further including reading means for optically reading the bar code, printed on the recording sheet, representing the transaction information and for outputting the transaction information represented by the bar code, the transaction information being processed by the terminal unit.

According to the present invention, target commodity information items which have been input to the terminal unit can be easily obtained by optically reading the bar code, printed on the recording sheet, representing the transaction information including the target commodity information items. As a result, the target commodity information items which have been input to the terminal unit can be easily processed.

For example, the target commodity information can be easily corrected by using the transaction information obtained by the reading means.

Further, the target commodity information can be easily aggregated by using the transaction information obtained by the reading means.

In addition, the aggregate result may be printed out on a recording sheet. The aggregate result may be also transmitted to a host unit coupled to the terminal unit.

BRIEF DESCRIPTION OF THE DRAWINGS

Other objects, features and advantages of the present invention will become apparent from the following detailed description when read in conjunction with the accompanying drawings, in which:

FIGS. 3A, 3B, 3C and 3D are diagrams illustrating examples of high density codes;

FIG. 7A is a diagram illustrating a structure of data aggregated for each terminal;

FIG. 7B is a diagram illustrating a structure of data aggregated for each dealing department;

FIG. 9 is a diagram illustrating an example of a form supplied in the accounts supply service.

DESCRIPTION OF THE PREFERRED EMBODIMENTS

A description will given of an embodiment of the present invention.

Figure 1:
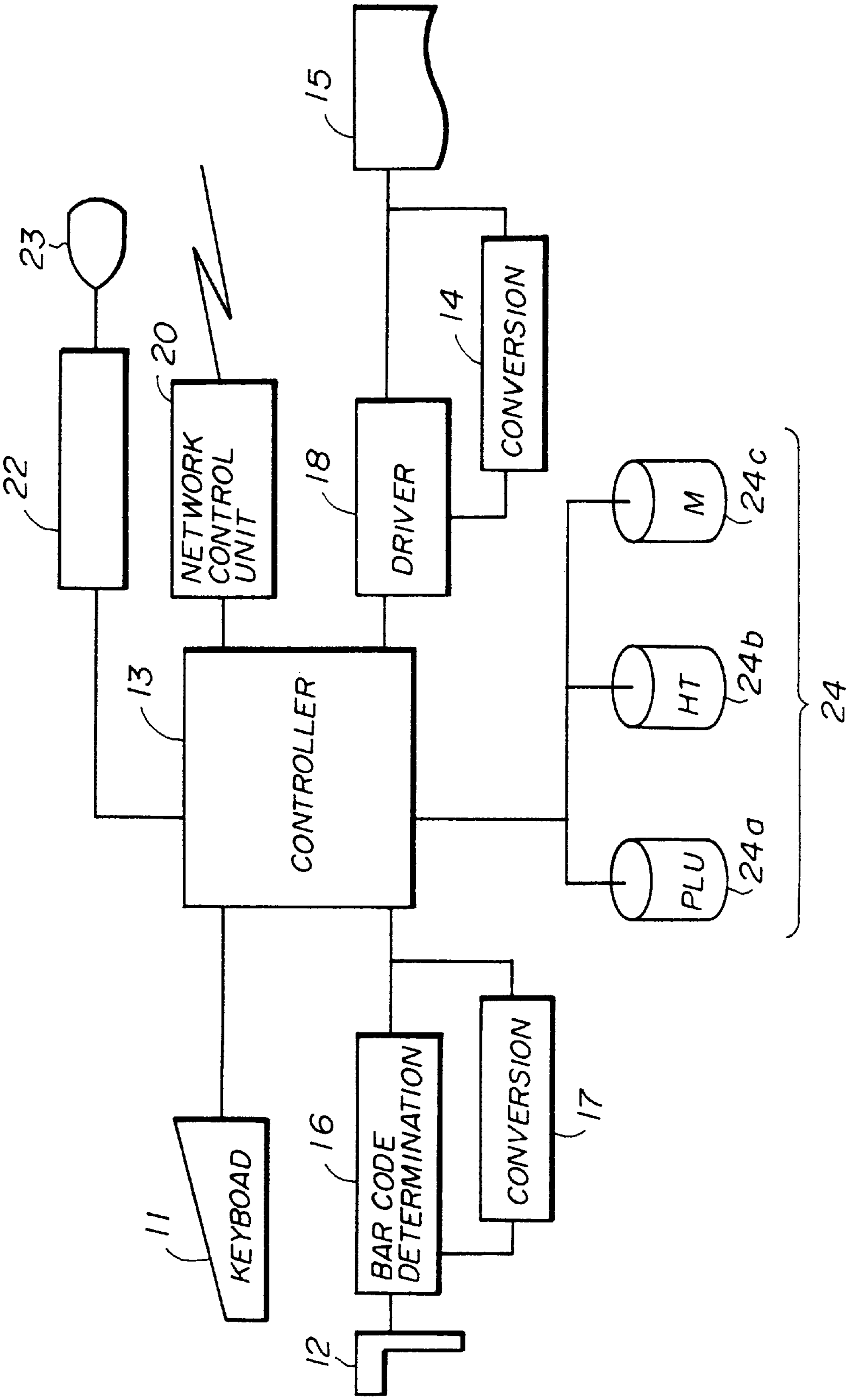
FIG. 1 is a block diagram illustrating a POS terminal unit according to an embodiment of the present invention.

FIG. 1 shows a POS terminal unit according to an embodiment of the present invention. Referring to FIG. 1, a POS terminal unit has a keyboard 11, a scanner 12, a controller 13, a first conversion unit 14, a printer unit 15, a bar code determination unit 16, a second conversion unit 17, a driver circuit 18, a network control unit 20, a display driving circuit 22, a display unit 23 and a storage unit 24. Information about commodities bought by customers are input by means of the keyboard 11 and the scanner 12.

The scanner 12 optically scans a bar code, such as a JAN code, provided on each commodity and outputs commodity information including a commodity name, a commodity code and the like. The bar code determination unit 16 determines, based on information supplied from the scanner 12, whether the scanner 12 has scanned a normal bar code which is provided on each commodity or a high-density bar code which will be described later. When the bar code determination unit 16 determines that the scanner 12 has scanned the normal bar code, the commodity information is supplied to the controller 13 via the bar code determination unit 16. The storage unit 24 has a first unit 24*a* storing a price look-up table (PLU), a second unit 24*b* storing a hard-total (HT) aggregate and a memory 24*c*. The controller 13 adds a unit price to the commodity information with reference to the price look-up table stored in the first unit 24*a* of the storage unit. The commodity information including the commodity name, the commodity code, the unit price and the number of commodities of each kind is stored in the memory 24*c*. The controller also performs an aggregate process for aggregating commodity information of respective commodities. The result thereof is stored, as the aggregate result (hard-total), in the second unit 24*b* of the storage unit 24. The commodity information items corresponding to the respective commodities are supplied to the driver circuit 18. The driver circuit 18 drives printers of the printer unit (PRNTR) 15 based on the commodity information items, so that commodity information items (e.g. commodity names, commodity codes, unit prices, the number of commodities and consumption tax) are printed on receipt and journal media (e.g., a receipt paper and a journal paper). The aggregate results stored in the second unit 24*b* of the storage unit 24 are supplied to the network control unit 20 via the controller 13 and transmitted from the network control unit 20 to the host computer via the network. The host computer carries out management of transactions based on the aggregate results supplied from the respective POS terminals.

When an input operation performed by using the scanner 12 and the keyboard 11 is completed, the commodity information in a transaction is read out from the memory 24*c*. The commodity information read out from the memory 24*c* and other information such as a total price of commodities in a transaction, an identification number of the POS terminal, a commodity dealing department, a date and an operator name are supplied to the first conversion unit 14 via the driver circuit 18. The first conversion unit 14 converts the above information into pattern data corresponding to a high density bar code.

The high density bar code is also referred to as a multi-dimensional bar code (e.g. a two-dimensional bar code). The high density bar code differs from the normal bar code such as the JAN code in that English characters and Japanese characters (Kana characters and Chinese characters) can be coded into the high density bar code. That is, an amount of information represented by the high density bar code is significantly greater than an amount of information represented by the normal bar code. Examples of the high density bar code are shown in FIGS. 3A, 3B, 3C and 3D. A code pattern shown in FIG. 3A is referred to as a PSD 417, a code pattern shown in FIG. 3B is referred to as a DATACODE, a code pattern shown in FIG. 3C is referred to as a VERICODE and a code pattern shown in FIG. 3D is referred to as a code 16*k*. The high density bar code can represent the above transaction information, such as commodity names, commodity codes, unit prices, the number of commodities, the total price of commodities in a transaction, the identification number of the POS terminal, the commodity dealing department, the date and the operator name.

Figure 2A:
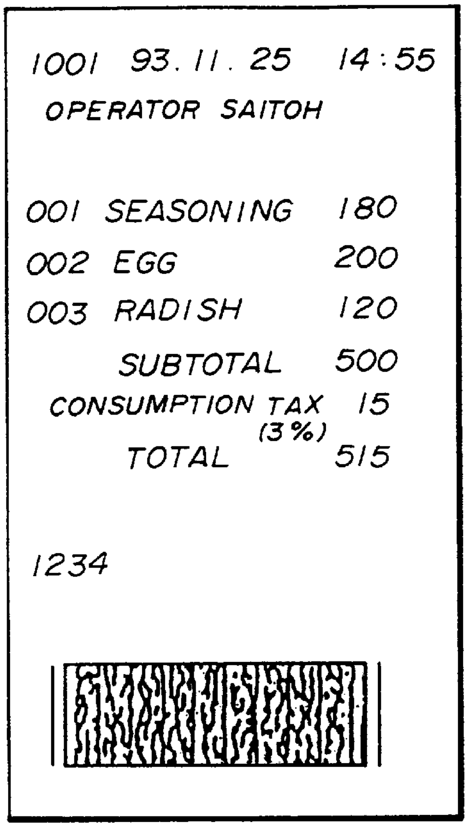
FIG. 2A is a diagram illustrating an example of a receipt paper on which transaction data items have been printed.
Figure 2B:
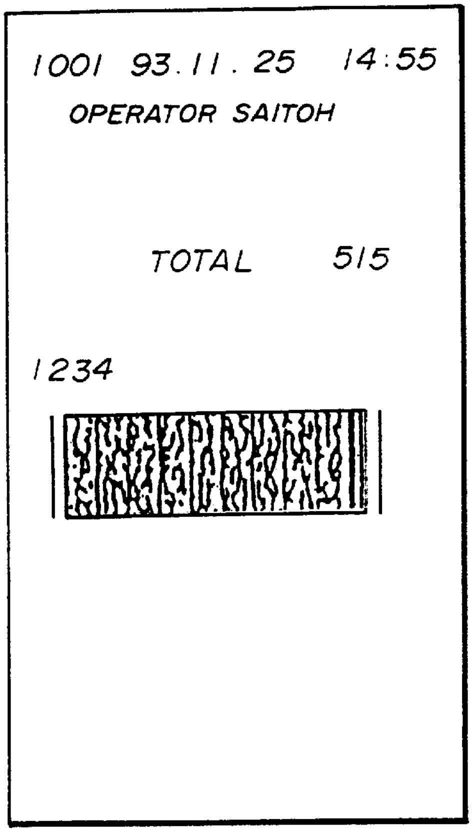
FIG. 2B is a diagram illustrating an example of a journal paper on which transaction data items have been printed.

The transaction information printed on the receipt paper and the journal paper for a transaction is converted into pattern data corresponding to a high density bar code by the first conversion unit 14 and printed on the receipt paper and the journal paper as respectively shown in FIGS. 2A and 2B. The journal paper is printed for a store. Thus, in a case where the above transaction information is printed as the high density bar code, only the total price and the operator name may be printed as characters on the journal. On the other hand, the receipt paper is printed for a customer. Thus, commodity names, prices, consumption tax and the like must be printed as characters on the receipt papers.

Figure 4:
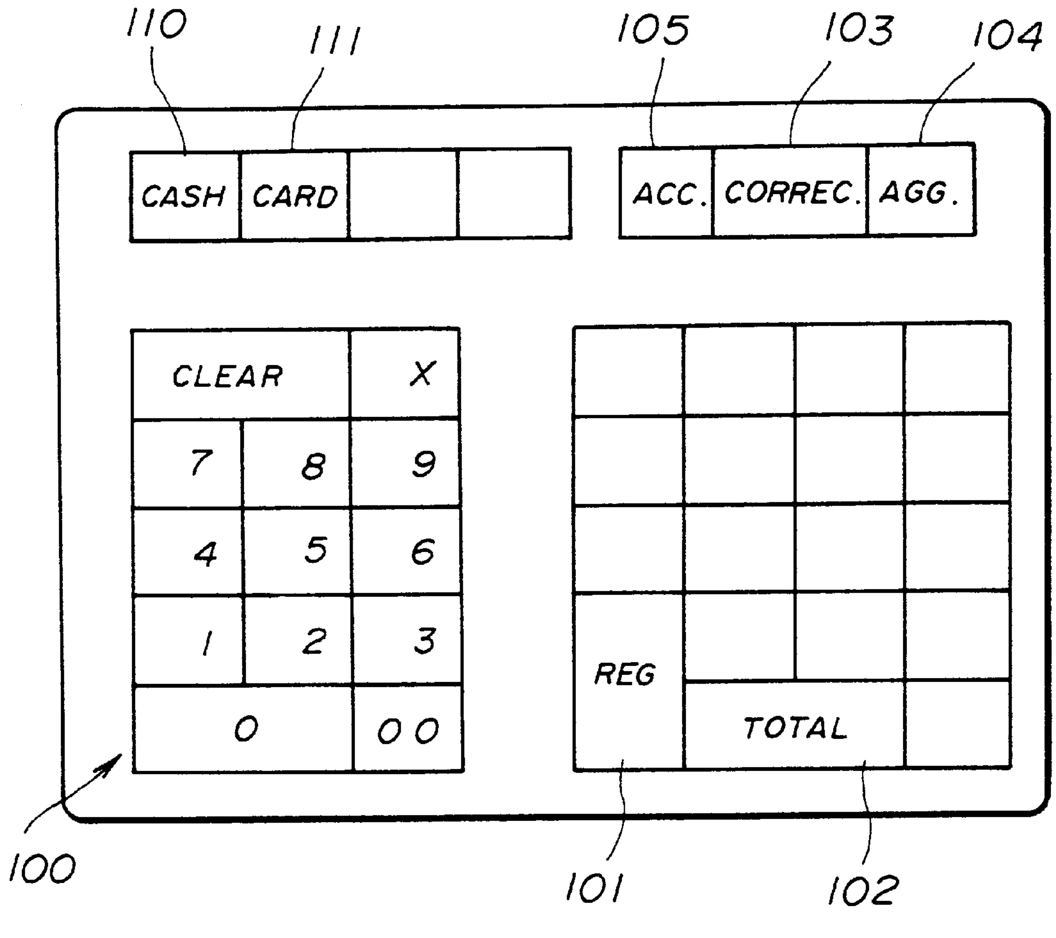
FIG. 4 is a diagram illustrating an example of a layout in a keyboard.

The keyboard 11 is formed as shown in FIG. 4. Referring to FIG. 4, the keyboard 11 has ten keys 100, a register key 101, a total key 102, a correction key 103, a substitute aggregate key 104, an accounts supply key 105, a cash key 110 and a credit card key 111. The register key 101 is operated for the normal register operation. The correction key 103 is operated to correct commodity information which has been input. The substitute aggregate key 104 is operated to aggregate commodity information items in place of the host computer. The account supply key 105 is operated for the account supply service.

The scanner 12 can optically read the high density bar code printed on the receipt paper and the journal paper. When the bar code determination unit 16 determines that the bar code read by the scanner 12 is the high density bar code, information output from the scanner 12 is supplied to the second conversion unit 17 via the bar code determination unit 16. The second conversion unit 17 converts the information supplied from the scanner 12 into character information corresponding to the transaction information represented by the high density bar code read by the scanner. The character information is supplied to the controller 13. The controller 13 processes the transaction information (corresponding to the character information) and supplies a part (the commodity information) of the transaction information to the display driving circuit 22. The display driving circuit 22 drives the display unit 23 based on the commodity information, so that the display unit 23 displays the commodity information.

Figure 10A:
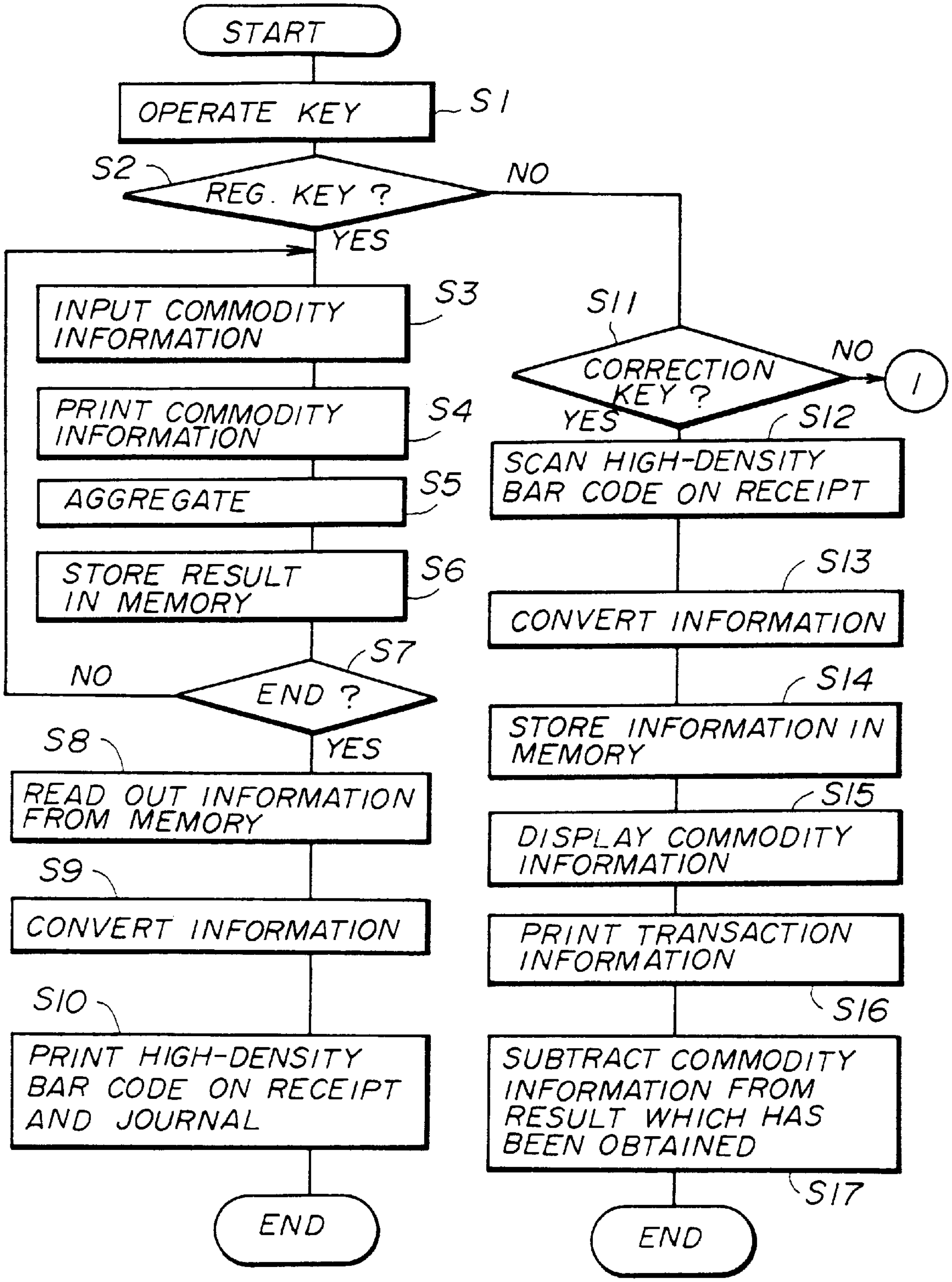
FIGS. 10A and 10B are flow charts illustrating a process carried out by a POS terminal unit.
Figure 10B:
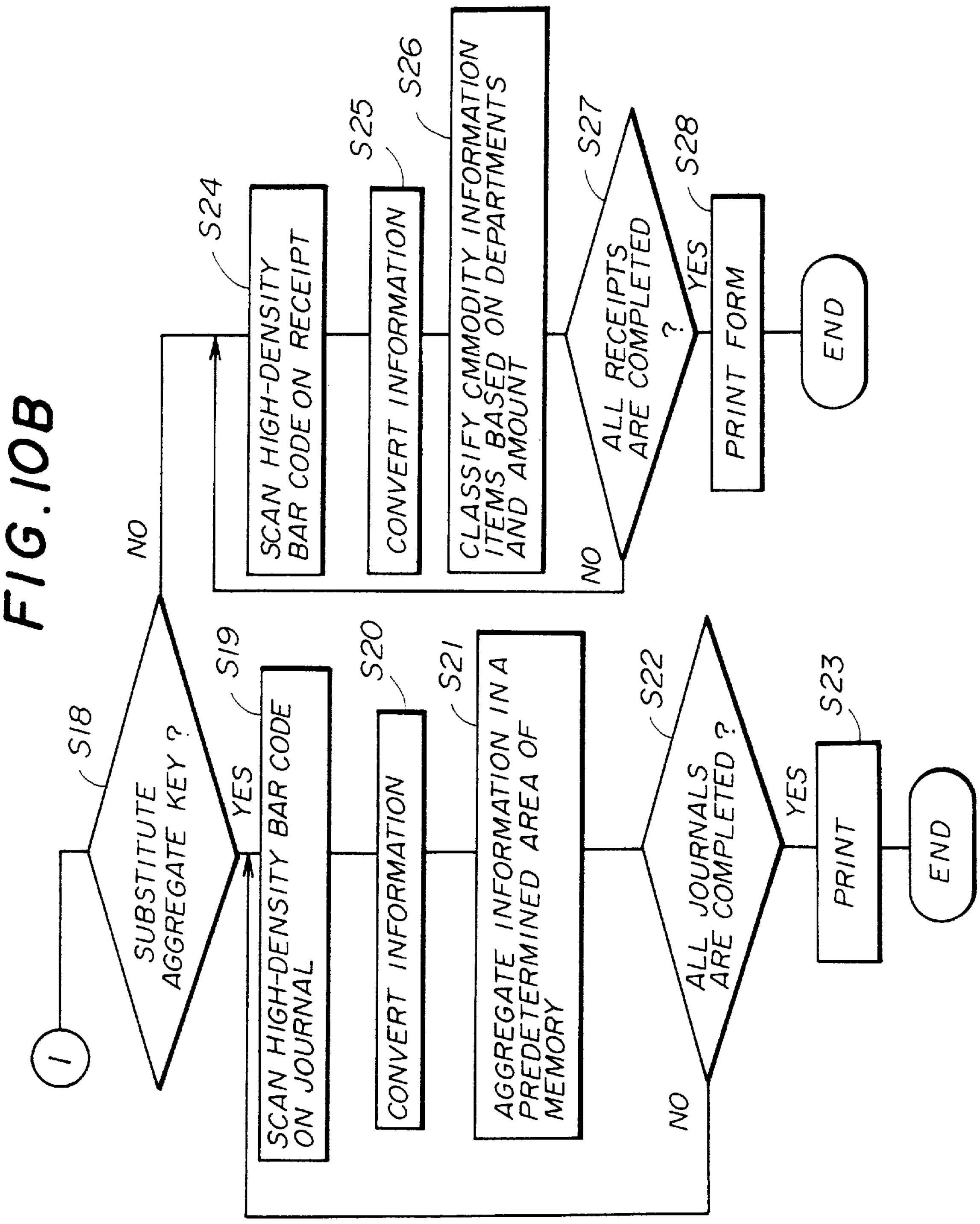

A process is executed in the POS terminal in accordance with the flow charts shown in FIGS. 10A and 10B.

Referring to FIG. 10A, after a key of the keyboard 11 is operated (S1), it is determined whether the operated key is the register key 101. In the case of a register operation, a bar code, representing commodity information, provided on each commodity is scanned by the scanner 12 after the register key 101 is operated. In this case, it is determined, in step S2, that the operated key is the register key 101. The information from the scanner 12 and the keyboard 11 is then supplied to the controller 13 (S3). A commodity information item is printed on the receipt paper and the journal paper every time the commodity information is input to this POS terminal unit (S4). Commodity information items (prices) are aggregated (S5), and the itemized commodity information and the aggregate results are stored in the storage unit 24 (S6). After this, it is determined whether or not the register operation is completed, that is, whether or not the total key 102 is operated (S7). If the total key 102 has not yet been operated, commodity information items for the next commodity are processed in accordance with the same steps S3, S4, S5 and S6. These steps are repeated until the total key 102 is operated.

If the total key 102 is operated (S7), the total price of the commodities, the consumption tax and other transaction information are printed on the receipt paper. After this, the commodity information items for the present transaction are read out from the memory 24*c* (S8). The commodity information items from the memory 24*c* and other transaction information supplied from the controller 13 are converted into pattern data corresponding to the high density bar code by the first conversion unit 14 (S9). The pattern data from the first conversion unit 14 is supplied to the printer unit 15, so that the printer unit 15 prints the high density bar code representing the commodity information items on the receipt paper and the journal paper as respectively shown in FIGS. 2A and 2B (S10). The receipt paper (FIG. 2A) on which characters corresponding to the transaction information including the commodity information items have been printed is given by the operator to the customer.

Figure 5:
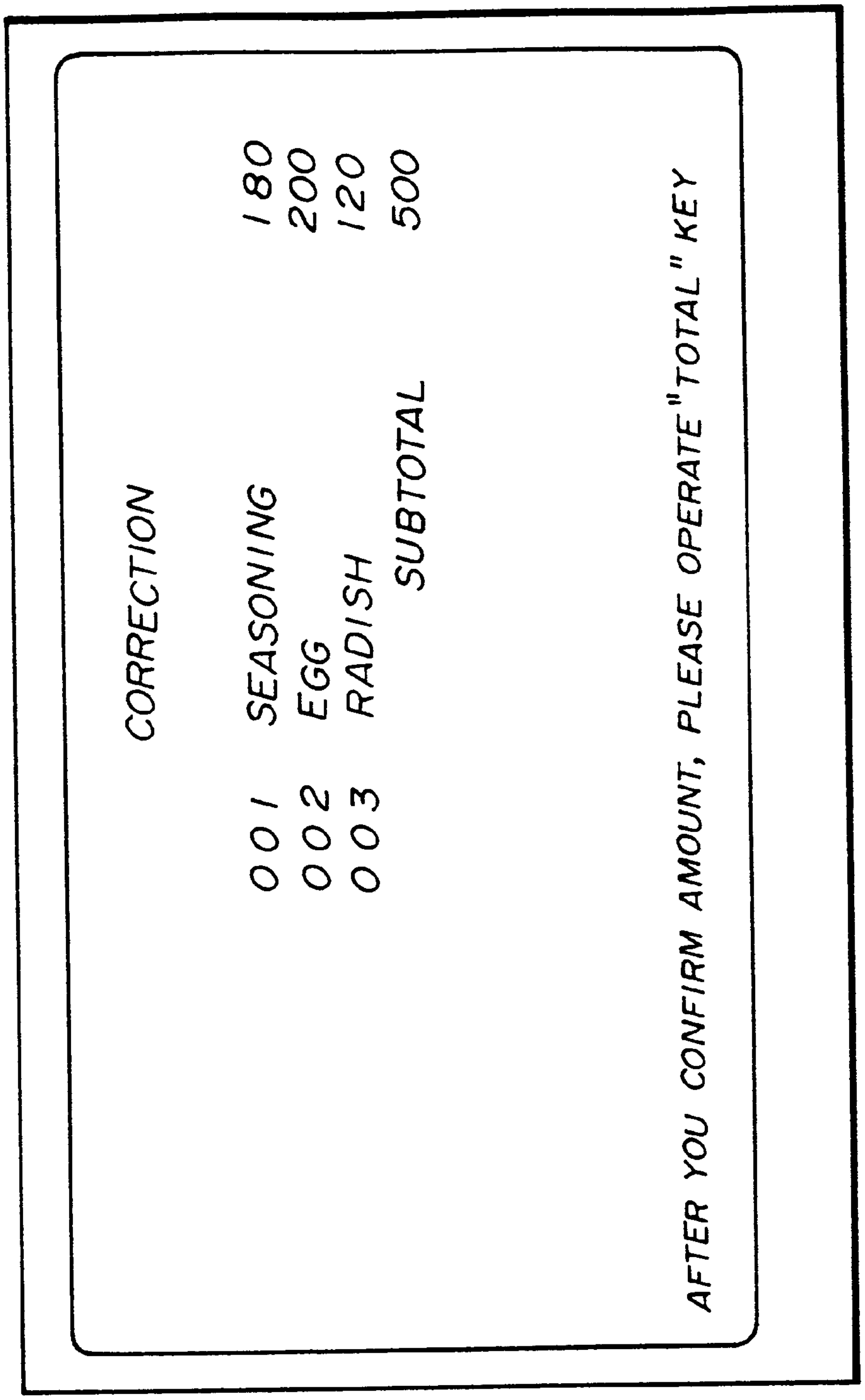
FIG. 5 is a diagram illustrating an example of a screen of a display unit.
Figure 6:
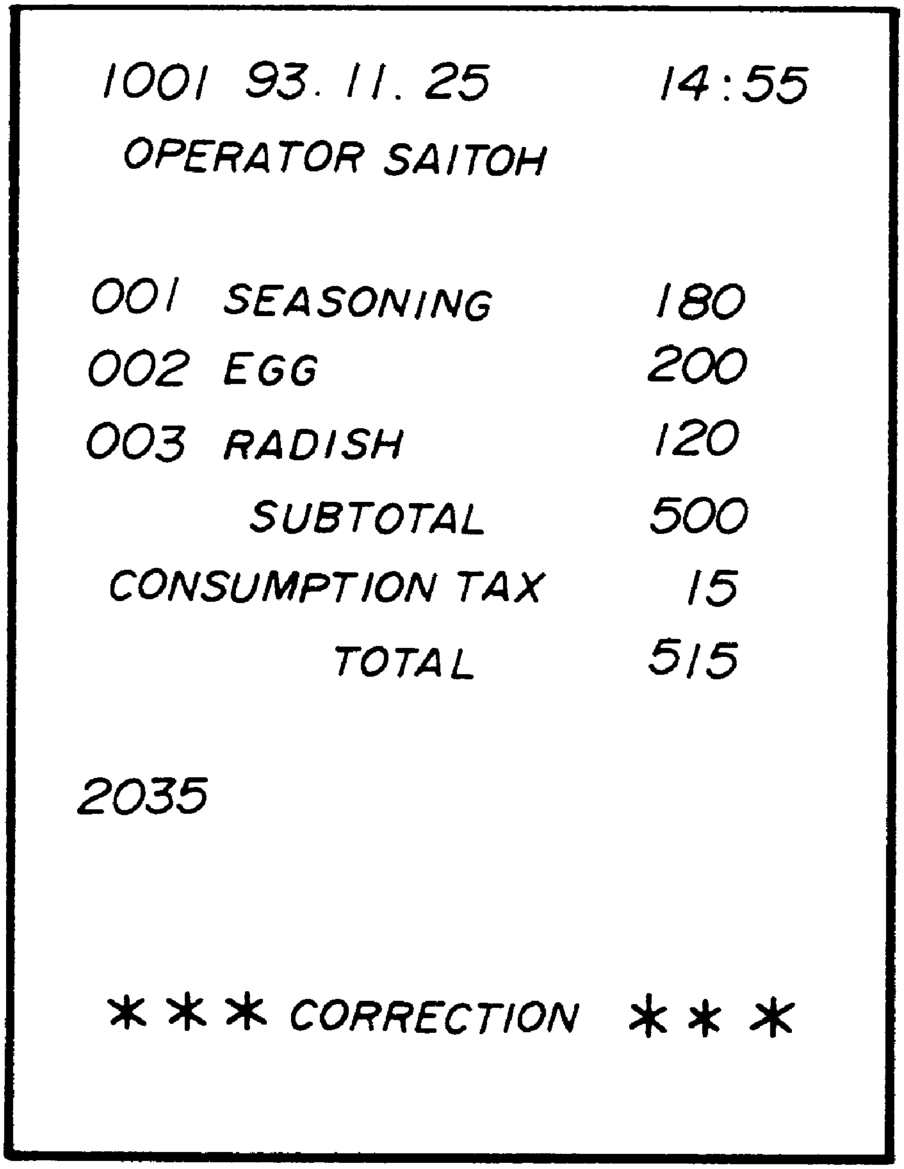
FIG. 6 is a diagram illustrating an example of a correct receipt obtained in a correction mode.

In a case where the operator is aware that an error has occurred in the register operation, the operator operates the correction key 103 of the keyboard 11. In this case, after it is determined, in step S2, that the operated key is not the register key 101, it is determined, in step S11, that the correction key 103 has been operated. After this, the high density bar code printed on the receipt paper is scanned by the scanner 12 (S12). The high density bar code represents the commodity information including information to be corrected. Since the bar code determination unit 16 determines, in this case, that the scanner 12 has scanned the high density bar code, the information output from the scanner 12 is supplied to the second conversion unit 17 via the bar code determination unit 16. The second conversion unit 17 converts the information supplied from the scanner 12 into character information corresponding to the transaction information represented by the high density bar code (S13). The transaction information is then stored in the memory 24*c* (S14). The transaction information includes incorrect information which has been registered in the last register operation. The commodity information included in the transaction information is read out from the memory 24*c* and is then displayed by the display unit 23 as shown in FIG. 5 (S15). The operator looks at the screen of the display unit 23 and can confirm that the commodity information includes the incorrect information. In this state, when the operator operates the total key 102, the transaction information stored in the memory 24*c* is supplied to the printer unit 15 via the controller 13 and the driver circuit 18. As a result, the transaction information to be corrected is printed on a receipt paper as shown in FIG. 6 (S16). In addition, the commodity information items, such as prices of commodities and the number of commodities of each kind, are subtracted from the aggregate result stored in the second unit 24*b* (the HT aggregate) of the storage unit 24 (S17). After this, the commodity information items including correct information items, to which the incorrect information items are changed, are input by using the keyboard 11, and added to the aggregated result from which the incorrect data has been subtracted.

Only incorrect information selected from the commodity information items displayed by the display unit 23 may be subtracted from the aggregate results.

If a trouble, such as a network malfunction, occurs in the system so that the host computer can not execute the aggregation of the commodity information items, the journal papers are collected, from the respective POS terminal units, coupled to the host computer, at one or some selected POS terminals. In each POS terminal to which the journal papers are collected, the following operations, referred to as a substitute aggregation, are carried out.

Figure 8:
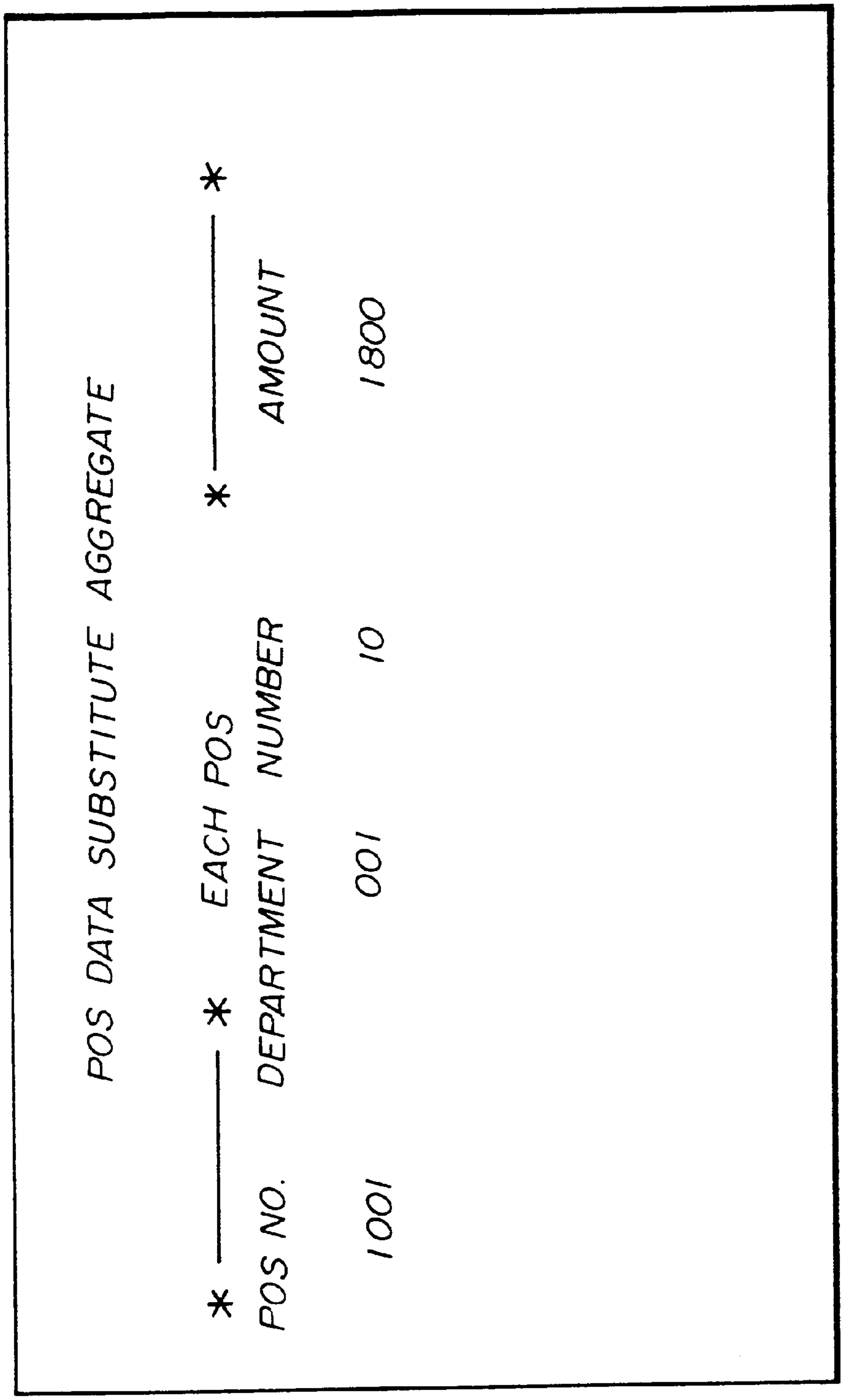
FIG. 8 is a diagram illustrating an example of a form on which aggregated data items are arranged.

First, the operator operates the substitute aggregate key 104. In this case, it is determined, in step S11, that the correction key 103 is not operated, and the process proceeds to step S18 shown in FIG. 10B. Referring to FIG. 10B, it is determined, in step S18, that the substitute aggregate key 104 has been operated. After the substitute aggregate key 104 is operated, the high density bar codes printed on the collected journal papers are scanned by the scanner 12 one by one (S19). Information output from the scanner 12 is supplied to the second conversion unit 17 via the bar code determination unit 16. The second conversion unit 17 converts the information supplied from the scanner 12 into character information corresponding to the transaction information represented by the high density bar codes (S20). The controller 13 aggregates commodity information items (e.g. prices and the number of commodities) included in the transaction information supplied from the second conversion unit 17 in a predetermined area of the memory 24*c* (S21). In this substitute aggregate process, the commodity information items are classified into groups for respective POS terminals and the classified commodity information items in each group are aggregated for each commodity dealing department, as shown in FIG. 7A. The commodity information items may be classified into groups for respective commodity dealing departments and the classified commodity information items in each group may be aggregated for each POS terminal, as shown in FIG. 7B. The substitute aggregate process in steps S19, S20 and S21 is repeated until the high density bar codes on all journals have been completely processed (S22). After this, an aggregate result, for a POS terminal, is read out from the predetermined area of the memory 24*c* and printed in a form as shown in FIG. 8 by the printer unit 15 (S23).

If the host computer is recovered, the aggregate results stored in the memory 24*c* may be transmitted from the network control unit 20 to the host computer.

The accounts supply service for a customer may be performed as follows.

In a case where a customer brings receipt papers which have been collected in a predetermined period (e.g. a month) to a store, an operator of a POS terminal unit operates the accounts supply key 105. In this case, it is determined, in step S18 shown in FIG. 10B, that the substitute aggregate key 104 has not been operated. The high density bar codes printed on the receipt papers brought by the customer are scanned by the scanner 12 (S24). Information output from the scanner 12 is converted, by the second conversion unit 17, into character information corresponding to the transaction information (commodity names, commodity codes, unit prices, numbers of commodities, dates and the like) represented by the high density bar codes (S25). The controller 13 aggregates commodity information items (e.g. prices and the number of commodities) included in the transaction information supplied from the second conversion unit 17 in a predetermined area of the memory 24*c* (S26). After this, the aggregate result is read out from the predetermined area of the memory 24*c* and printed in a form as shown in FIG. 9 (S29). The customer receives the printed form, which can be used as a household accounts in the predetermined period (e.g. a month).

According to the POS system as has been described above, the high density bar code representing the transaction information including commodity information items is printed on a receipt paper and a journal paper. Thus, the trading information can be input to the POS terminal by optically reading the high density bar code without performing the manual input operation using the keyboard. In addition the commodity information obtained by optically reading the high density bar code can be used to correct commodity information which has been registered and for various services. The aggregation of commodity information items can be performed by using high density bar codes printed on the journal papers in the respective POS terminal units.

The present invention is not limited to the aforementioned embodiments, and variations and modifications may be made without departing from the scope of the claimed invention.

What is claimed is:

1. A terminal unit for processing information relating to commodities involved in transactions, the information comprising commodity information identifying the commodities involved in a related transaction and transaction information identifying the related transaction in which the commodities are involved, the terminal unit comprising:

a printer which prints on a recording sheet, selectively, characters which are human readable and bar code patterns which are machine readable in accordance with character print information and bar code print information, respectively, supplied thereto;

input means for inputting commodity information identifying commodities involved in a related transaction and transaction information identifying the related transaction;

conversion means for converting transaction information and input commodity information into corresponding bar code print information defining a corresponding bar code pattern;

first control means for supplying to said printer the commodity information, input by said input means, identifying the commodities involved in a related transaction, and at least a part of the related transaction information, as character print information and for controlling the printer to print the corresponding, commodity and transaction information as human readable characters on a recording sheet; and second control means for supplying to said printer, bar code print information comprising the commodity information for all commodities involved in a transaction and the related transaction information, as converted by said conversion means to corresponding bar code print information, and for controlling the printer to print the corresponding commodity and transaction information as a machine readable bar code pattern on the recording sheet.

2. The terminal unit as claimed in claim 1, wherein the bar code pattern is a two-dimensional high density bar code pattern.

3. The terminal unit as claimed in claim 1, wherein said input commodity information for each commodity involved in a transaction includes at least a unit price of the commodity, an identification code for the commodity and a number of plural commodities of a common type thereof.

4. The terminal unit as claimed in claim 3, wherein said transaction information related to said input commodity information comprises a total price of all commodities involved in the transaction, an identification code of said terminal unit, a department code for the respective department dealing with each involved commodity, a transaction date and an identification code of an operator of said terminal unit.

5. The terminal unit as claimed in claim 1, further comprising:

reading means for optically reading and converting the bar code pattern printed on the recording sheet, representing the corresponding transaction information, and for outputting the corresponding transaction information represented by the bar code pattern, the output transaction information being processed by said terminal unit.

6. The terminal unit as claimed in claim 5, wherein the bar code pattern is a high density, two-dimensional bar code pattern.

7. The terminal unit as claimed in claim 6, wherein said reading means further comprises a scanner for optically scanning the high density bar code pattern and for outputting a corresponding data signal, and second conversion means for converting the data signal output by said scanner into the transaction information represented by said optically scanned high density bar code pattern.

8. The terminal unit as claimed in claim 5, further comprising:

display means for displaying information corresponding to the transaction information output by said reading means.

9. The terminal unit as claimed in claim 5, further comprising:

correction means for correcting input commodity information using the transaction information output by said reading means.

10. The terminal unit as claimed in claim 5, further comprising:

aggregating means for aggregating, in accordance with a predetermined rule and for plural transactions, commodity information as to the commodities respectively involved in each of the plural, related transactions of the transaction information which is output by said reading means and producing an aggregated result output.

11. The terminal unit as claimed in claim 10, further comprising:

result printing control means for controlling the printer to print the aggregated result output of said aggregating means on the recording sheet.

12. The terminal unit as claimed in claim 10, further comprising:

transmission means for transmitting the aggregated result output of said aggregating means to a host unit coupled to said terminal unit.

13. The terminal unit as claimed in claim 1, wherein said terminal unit is a POS terminal which is coupled to a host computer.

14. The terminal unit as claimed in claim 1, wherein the recording sheet comprises a receipt sheet and a journal sheet, the transaction information and the bar code pattern being printed on the receipt paper sheet and a part of the transaction information and the bar code pattern being printed on the journal paper sheet.

15. The terminal unit as claimed in claim 1, wherein:

the recording sheet comprises a receipt sheet and a journal sheet;

the first control means is operable, further, for selecting and supplying to the said printer all of the commodity information identifying the commodities involved in a related transaction as character print information and for controlling the printer to print same as human readable commodity information print characters on the receipt sheet and for selecting and supplying to said printer a first selected set of transaction information and for controlling the printer to print same as human readable transaction information print characters on the receipt sheet; and the second control means, is operable, further, for selecting and supplying to said printer bar code print information comprising the commodity information for all commodities involved in a transaction and a second selected set of the related transaction information, as converted by said first conversion means to corresponding bar code print information, and for controlling the printer to print the corresponding bar code pattern on each of the receipt sheet and the journal sheet.

16. A terminal unit for processing information relating to commodities involved in transactions, the information comprising commodity information identifying the commodities involved in a related transaction and transaction information identifying the related transaction in which the commodities are involved, each commodity having a bar code pattern thereon which is machine readable and is of a first type, representing commodity information identifying the commodity, the terminal unit comprising:

a printer which prints on a recording sheet, selectively, characters which are human readable and bar code patterns which are machine readable and are a second type, different from the bar code patterns of the first type, in accordance with character print information and bar code print information, respectively, supplied thereto;

a scanner for selectively, optically scanning bar code patterns of the first type and of the second type and for outputting bar code information corresponding to the respective, scanned bar code patterns;

first control means, responsive to bar code information output by said scanner and corresponding to a first type of bar code pattern, as provided on and identifying a commodity involved in a transaction, for outputting the corresponding commodity information as commodity character print information, for supplying the commodity character print information to said printer and for controlling said printer to print the commodity information as human readable print characters on a recording sheet;

first conversion means for converting commodity information and transaction information, related to the commodity information, into bar code information corresponding to the second type of bar code pattern; and second control means for supplying the second type of bar code information, corresponding to the second type of bar code pattern, to said printer as bar code print information of the second type and comprising the commodity information for all commodities involved in a transaction and related transaction information, and for controlling said printer to print the corresponding commodity and related transaction information as a bar code pattern of the second type on the recording sheet on which the human readable print character commodity information for the corresponding transaction is printed.

17. The terminal unit as claimed in claim 16, wherein the second type of bar code pattern is a high density, two-dimensional bar code pattern.

18. The terminal unit as claimed in claim 17, wherein said commodity information for each commodity involved in a transaction includes at least a unit price of the commodity, an identification code for the commodity and a number of plural commodities of a common type thereof.

19. The terminal unit as claimed in claim 18, wherein said transaction information related to said commodity information comprises a total price of all commodities involved in the transaction, an identification code of said terminal unit, a department code for the respective department dealing with each involved commodity, a transaction date and an identification code of an operator of said terminal unit.

20. The terminal unit as claimed in claim 16, further comprising:

determination means for determining, based on the information output from said scanner, whether the corresponding bar code pattern scanned by said scanner is the first type of bar code pattern or the second type of bar code pattern and producing a corresponding first and second determination outputs; and second conversion means, responsive to a first determination output of said determination means, for converting the information output by said scanner into the transaction information represented by said scanned, second type of bar code pattern and outputting same for processing thereof by said terminal unit.

21. The terminal unit as claimed in claim 20, wherein the second type of bar code pattern is a high density, two-dimensional bar code pattern.

22. The terminal unit as claimed in claim 20, further comprising:

display means for displaying information corresponding to the transaction information output by said second conversion means.

23. The terminal unit as claimed in claim 20, further comprising:

correction means for correcting commodity information, which has been processed by said terminal unit, using the transaction information output by said second conversion means.

24. The terminal unit as claimed in claim 20, further comprising:

aggregating means for aggregating, in accordance with a predetermined rule and in relation to plural transactions, commodity information as to the commodities respectively involved in the plural transactions and producing an aggregate result output.

25. The terminal unit as claimed in claim 20, further comprising:

third control means for supplying each aggregate commodity result output of said aggregate means to the printer as corresponding character print information and controlling said printer so as to print the aggregate commodity result in human readable characters on the recording sheet.

26. The terminal unit as claimed in claim 20, further comprising:

transmission means for transmitting the aggregate commodity result output of said aggregate means to a host unit coupled to said terminal unit.

27. The terminal unit as claimed in claim 16, wherein said terminal unit is a POS terminal which is coupled to a host computer.

28. The terminal unit as claimed in claim 16, wherein the recording sheet comprises a receipt sheet and a journal sheet, the transaction information and the bar code pattern being printed on the receipt sheet and a part of the transaction information and the bar code pattern being printed on the journal sheet.

29. The terminal unit as claimed in claim 16, wherein:

the recording sheet comprises a receipt sheet and a journal sheet;

the first control means is operable, further, for selected and supplying to the said printer all of the commodity information identifying the commodities involved in a related transaction as character print information and for controlling the printer to print same as human readable commodity information print characters on the receipt sheet and for selecting and supplying to said printer a first selected set of transaction information and for controlling the printer to print same as human readable transaction information print characters on the receipt sheet; and the second control means, is operable, further, for selecting and supplying to said printer bar code print information comprising the commodity information for all commodities involved in a transaction and a second selected set of the related transaction information, as converted by said first conversion means to corresponding bar code print information, and for controlling the printer to print the corresponding bar code pattern of the second type on each of the receipt sheet and the journal sheet.

30. A terminal unit for processing information relating to commodities involved in transactions, the information comprising commodity information identifying the commodities involved in a related transaction and transaction information identifying the related transaction in which the commodities are involved, each commodity having a bar code pattern thereon which is machine readable and is of a first type, representing commodity information identifying the commodity, the terminal unit comprising:

a printer which is controllable for printing, selectively on a receipt sheet and on a journal sheet, human readable characters and machine readable bar code patterns of a second type, differing from the first type, in accordance with character print information and bar code print information supplied thereto;

a scanner for selectively, optically scanning bar code patterns of the first type and of the second type and for outputting bar code information corresponding to the respective, scanned bar code patterns;

first control means, responsive to bar code information output by said scanner and corresponding to a first type of bar code pattern provided on and identifying a commodity, for outputting to the printer the corresponding commodity information as commodity character print information and for selecting a first set of the related transaction information and outputting to the printer the selected, first set of related transaction information as corresponding transaction character print information and for controlling said printer to print the corresponding commodity information and the selected, first set of related transaction information as human readable print characters on a receipt sheet;

conversion means for converting transaction information and commodity information into corresponding transaction and commodity bar code information of a second type of bar code pattern, of a higher density than the first type of bar code pattern; and second control means for selecting and supplying to said printer, bar code print information of the second type, as output by said first conversion means and corresponding to the commodity information for all commodities involved in a transaction and a second set of selected transaction information of the related transaction and for controlling said printer to print, on each of the receipt sheet and journal sheet, the corresponding commodity information and the selected, second set of related transaction information as a bar code pattern of the second type, for each transaction and the respective commodities involved therein.

31. The terminal unit as claimed in claim 30, wherein said commodity information selected by the first control means for printing as corresponding human readable characters on the receipt sheet comprises at least a commodity name and a unit price of the commodity.

32. The terminal unit as claimed in claim 30, wherein the transaction information selected by the first control means for printing in human readable characters on the receipt sheet for each transaction comprises at least one of the date and the time of the transaction and the total price of all commodities involved in the related transaction.

* * * * *